United States Patent
Hattori et al.

(10) Patent No.: US 11,453,399 B2
(45) Date of Patent: Sep. 27, 2022

(54) FLOOD SENSING DEVICE, FLOOD SENSING SYSTEM, AND NON-TRANSITORY COMPUTER READABLE MEDIUM

(71) Applicant: TOYOTA JIDOSHA KABUSHIKI KAISHA, Toyota (JP)

(72) Inventors: Jun Hattori, Chofu (JP); Takayuki Yamabe, Nagoya (JP); Kenki Ueda, Edogawa-ku (JP); Tetsuya Hashimoto, Shinagawa-ku (JP); Hajime Tojiki, Musashino (JP); Naoki Ishihara, Shinagawa-ku (JP); Yuta Ochiai, Yokohama (JP); Hideki Kawai, Edogawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 16/987,516

(22) Filed: Aug. 7, 2020

(65) Prior Publication Data
US 2021/0046937 A1 Feb. 18, 2021

(30) Foreign Application Priority Data

Aug. 13, 2019 (JP) .............................. JP2019-148408

(51) Int. Cl.
*B60W 40/06* (2012.01)
*G05D 1/02* (2020.01)
(Continued)

(52) U.S. Cl.
CPC .......... *B60W 40/06* (2013.01); *G05D 1/0214* (2013.01); *G08G 1/0112* (2013.01); *B60W 2555/20* (2020.02)

(58) Field of Classification Search
CPC ............ B60W 40/06; B60W 2555/20; B60W 2050/0031; B60W 2050/0088;
(Continued)

(56) References Cited

U.S. PATENT DOCUMENTS

2002/0133288 A1* 9/2002 Minami .................. G01F 9/008
701/123
2019/0024781 A1* 1/2019 Chrungoo ............ G08G 1/0133
(Continued)

FOREIGN PATENT DOCUMENTS

DE 10 2014 210 103 A1 12/2015
EP 2 956 343 A1 12/2015
(Continued)

OTHER PUBLICATIONS

Machine translation of DE102014210103A1 (Year: 2015).*
(Continued)

*Primary Examiner* — Frederick M Brushaber
(74) *Attorney, Agent, or Firm* — Oblon, McClelland, Maier & Neustadt, L.L.P.

(57) ABSTRACT

A flood sensing device includes: an acquiring section that acquires plural types of traveling state data relating to traveling of a vehicle; and a sensing section that senses flooding of a road on which the vehicle travels by using (a) a physical quantity that is estimated on the basis of (i) a vehicle behavior model, which is configured by driving force of the vehicle and traveling resistance that includes air resistance applied to the vehicle, slope resistance applied to the vehicle and rolling resistance applied to the vehicle, and which determines the physical quantity that varies due to the vehicle traveling, and (ii) the plural types of traveling state data of the present time that are acquired by the acquiring (Continued)

section, and (b) the physical quantity that is obtained from the traveling state data of the present time that is acquired by the acquiring section.

5 Claims, 8 Drawing Sheets

(51) Int. Cl.
*G08G 1/01* (2006.01)
*B60W 50/00* (2006.01)
*B60W 40/10* (2012.01)

(58) Field of Classification Search
CPC ....... B60W 2520/10; B60W 2520/105; B60W 2540/10; B60W 2540/12; B60W 2552/15; B60W 2556/45; B60W 2556/50; B60W 2556/65; B60W 2756/10; B60W 40/1005; G05D 1/0214; G08G 1/0112
See application file for complete search history.

(56) References Cited

U.S. PATENT DOCUMENTS

| 2021/0018317 A1* | 1/2021 | Noma | G01C 13/008 |
| 2021/0031775 A1* | 2/2021 | Noma | B60W 40/06 |
| 2021/0046938 A1* | 2/2021 | Hattori | G08G 1/0141 |

FOREIGN PATENT DOCUMENTS

| EP | 3 118 079 A1 | 1/2017 |
| JP | 2004-341795 A | 12/2004 |
| JP | 2012-216103 A | 11/2012 |
| WO | WO 2009/013606 A2 | 1/2009 |

OTHER PUBLICATIONS

Machine translation of EP3118079A1 (Year: 2017).*
Extended European Search Report dated Jan. 14, 2021 in European Patent Application No. 20189735.2, 10 pages.

* cited by examiner

FIG.3

| VEHICLE TYPE ID | C1 | C21 | C22 | C23 | C24 |
|---|---|---|---|---|---|
| a | C1_a | C21_a | C22_a | C23_a | C24_a |
| b | C1_b | C21_b | C22_b | C23_b | C24_b |
| c | C1_c | C21_c | C22_c | C23_c | C24_c |

FLOOD SENSING DEVICE, FLOOD SENSING SYSTEM, AND NON-TRANSITORY COMPUTER READABLE MEDIUM

CROSS-REFERENCE TO RELATED APPLICATION

This application claims priority under 35 USC 119 from Japanese Patent Application No. 2019-148408, filed on Aug. 13, 2019, the disclosure of which is incorporated by reference herein.

BACKGROUND

Technical Field

The present disclosure relates to a flood sensing device, a flood sensing system, and a non-transitory computer readable medium.

Related Art

There are cases in which a road floods due to a large amount of rain falling, or rainwater that has fallen elsewhere flowing onto the road, or the like. Two techniques have been proposed for sensing such flooding of a road, such as in Japanese Patent Application Laid-Open (JP-A) No. 2004-341795 and JP-A No. 2012-216103 for example.

JP-A No. 2004-341795 proposes providing a flood sensor, which is configured so as to be able to sense the existence of tangible matter that is in a liquid form, at a vehicle so as to sense flooding of a road, and transmitting the results of sensing to a central server, and, at other vehicles, setting routes that do not go through impassable floods, and guiding the vehicles to detour routes.

JP-A No. 2012-216103 proposes, on the basis of the wiping speed and operation time of the wipers of a vehicle, estimating the amount of precipitation at the position where the vehicle is traveling, and, on the basis of estimated precipitation amounts from other vehicles, estimating whether or not flooding is occurring on the traveling route.

However, in the technique of JP-A No. 2004-341795, a flood sensor is required, and there is room for improvement in order to more easily determine flooding.

Further, in the technique of JP-A No. 2012-216103, even if the amount of precipitation is the same, not all drivers will operate the wipers at the same wiper speed, and there is room for improvement in order to accurately determine flooding.

SUMMARY

The present disclosure provides a flood sensing device, a flood sensing system, and a non-transitory computer-readable medium that may sense flooding of roads easily and highly accurately by using traveling state data of vehicles.

A first aspect of the present disclosure is a flood sensing device including: an acquiring section configured to acquire a plurality of types of traveling state data relating to traveling of a vehicle; and a sensing section configured to sense flooding of a road on which the vehicle travels by using (a) a physical quantity that is estimated on the basis of (i) a vehicle behavior model, which is configured by driving force of the vehicle and traveling resistance that includes air resistance applied to the vehicle, slope resistance applied to the vehicle and rolling resistance applied to the vehicle, and which determines the physical quantity that varies due to the vehicle traveling, and (ii) the plurality of types of traveling state data of the present time that are acquired by the acquiring section, and (b) the physical quantity that is obtained from the traveling state data of the present time that is acquired by the acquiring section.

In accordance with the first aspect of the present disclosure, the acquiring section acquires plural types of traveling state data that relate to the traveling of a vehicle. For example, there are cases in which the flood sensing device is installed in a vehicle, and there are cases in which the flood sensing device is provided at other than a vehicle, and the like. In a case in which the flood sensing device is installed in a vehicle, the acquiring section acquires the traveling state data of the own vehicle. Further, in a case in which the flood sensing device is provided at other than a vehicle, the acquiring section acquires traveling state data of a focused-upon vehicle that is determined in advance.

The sensing section senses flooding of the road on which the vehicle travels, by using (a) a physical quantity that is estimated on the basis of (i) a vehicle behavior model that determines the physical quantity that varies due to the vehicle traveling, and (ii) the plural types of traveling state data of the present time that are acquired by the acquiring section, and (b) the physical quantity that is obtained from the traveling state data of the present time that is acquired by the acquiring section. Due thereto, flooding can be sensed without using a flood sensing sensor. Further, a vehicle behavior model, which is configured from the driving force of the vehicle and the traveling resistance that includes air resistance applied to the vehicle, slope resistance applied to the vehicle and rolling resistance applied to the vehicle, is used as the vehicle behavior model. Due thereto, flooding of a road may be sensed easily and highly accurately by using the traveling state data of the vehicle.

A second aspect of the present disclosure is a flood sensing device including: an acquiring section configured to acquire a plurality of types of traveling state data relating to traveling from a plurality of vehicles; a deriving section configured to, by using the plurality of types of traveling state data that are acquired in advance from the plurality of vehicles, and a learning model that is determined in advance, derives a vehicle behavior model that is configured by driving force of the vehicle and traveling resistance that includes air resistance applied to the vehicle, slope resistance applied to the vehicle, and that determines a physical quantity that varies due to the vehicle traveling; and a sensing section configured to sense flooding of a road on which a predetermined focused-upon vehicle travels by using (a) the physical quantity that is estimated by using (i) the vehicle behavior model derived by the deriving section and (ii) the plurality of traveling state data of the present time that are acquired by the acquiring section from the focused-upon vehicle, and (b) the physical quantity that is obtained from the traveling state data acquired by the acquiring section from the focused-upon vehicle.

In accordance with the second aspect, the acquiring section acquires plural types of traveling state data that relate to traveling, from plural vehicles.

The deriving section derives the vehicle behavior model, which determines a physical quantity that varies due to the vehicle traveling, by using a learning model that is determined in advance, and plural types of traveling state data that are acquired in advance from plural vehicles.

Flooding of a road on which a predetermined focused-upon vehicle travels is sensed at the sensing section by using (a) the physical quantity that is estimated by using the vehicle behavior model and the plural types of traveling state data of the present time that are acquired by the acquiring section from the focused-upon vehicle, and (b) the physical quantity that is obtained from the traveling state data acquired by the acquiring section from the focused-upon vehicle. Due thereto, flooding can be sensed without providing a flood sensing sensor. Further, flooding of a road may be sensed easily and highly accurately by using the traveling state data of the vehicle by using, as the vehicle behavior model, a vehicle behavior model that is configured from the driving force of the vehicle and the traveling resistance that includes air resistance applied to the vehicle, slope resistance applied to the vehicle and rolling resistance applied to the vehicle.

In a third aspect of the present disclosure, in the first or second aspect, the traveling resistance may further include acceleration resistance that is applied to the vehicle.

In a fourth aspect of the present disclosure, in the first or second aspect, in a case in which a difference between the estimated physical quantity and the physical quantity obtained from the traveling state data is greater than or equal to a predetermined threshold value, the sensing section may determine that there is flooding and senses flooding. Due thereto, flooding may be sensed without using a flood sensing sensor.

In a fifth aspect of the present disclosure, in the above-described aspects, the vehicle behavior model may be derived by using a multiple regression formula as a learning model.

In a sixth aspect of the present disclosure, in the above-described aspects, the vehicle behavior model may be derived by using an equation of motion, by using speed, acceleration, or rate of change in acceleration of the vehicle, as the physical quantity.

A seventh aspect of the present disclosure is a flood sensing system including: a detecting section configured to detect a plurality of types of traveling state data relating to traveling of a vehicle; an acquiring section configured to acquire the plurality of types of traveling state data relating to traveling, which are detected by the detecting section, from a plurality of vehicles; a deriving section configured to, by using the plurality of types of traveling state data that the acquiring section acquires in advance from a plurality of vehicles, and a learning model that is determined in advance, derives a vehicle behavior model that is configured by driving force of the vehicle and traveling resistance that includes air resistance applied to the vehicle, slope resistance applied to the vehicle and rolling resistance applied to the vehicle, and that determines a physical quantity that varies due to the vehicle traveling; and a sensing section configured to sense flooding of a road on which a predetermined focused-upon vehicle travels by using (a) the physical quantity that is estimated by using (i) the vehicle behavior model derived by the deriving section and (ii) the plurality of types of traveling state data of the present time that are acquired by the acquiring section from the focused-upon vehicle, and (b) the physical quantity that is obtained from the traveling state data of the present time acquired by the acquiring section from the focused-upon vehicle.

In the seventh aspect of the present disclosure, the detecting section detects plural types of traveling state data that relate to traveling of a vehicle.

The plural types of traveling state data that are detected by the detecting section are acquired by the acquiring section from plural vehicles.

At the deriving section, the vehicle behavior model, which determines a physical quantity that varies due to the vehicle traveling, is derived by using the plural types of traveling state data that the acquiring section acquires in advance from plural vehicles, and a learning model that is determined in advance.

Further, at the sensing section, flooding of the road on which a predetermined focused-upon vehicle travels is sensed by using (a) a physical quantity that is estimated by using (i) the vehicle behavior model derived by the deriving section and (ii) the plural types of traveling state data of the present time that are acquired by the acquiring section from the focused-upon vehicle, and (b) the physical quantity that is obtained from the traveling state data acquired by the acquiring section from the focused-upon vehicle. Due thereto, flooding may be sensed without using a flood sensing sensor. Further, flooding of a road may be sensed easily and highly accurately by using the traveling state data of the vehicle by using, as the vehicle behavior model, a vehicle behavior model that is configured from the driving force of the vehicle and the traveling resistance that includes air resistance applied to the vehicle, slope resistance applied to the vehicle and rolling resistance applied to the vehicle.

The eight aspect of the present disclosure is a non-transitory computer readable medium storing a flood sensing program that causes a computer to function as the respective sections of the flood sensing device of any of the first through sixth aspects.

In accordance with the above-described aspects, the flood sensing device, flood sensing system, and non-transitory computer readable medium of the present disclosure may easily and highly accurately determine flooding of roads by using traveling state data of vehicles.

BRIEF DESCRIPTION OF THE DRAWINGS

Exemplary embodiments will be described in detail based on the following figures, wherein:

FIG. 3 is a drawing showing a table in which vehicle types and coefficients of models are set in correspondence;

DETAILED DESCRIPTION

Figure 1:
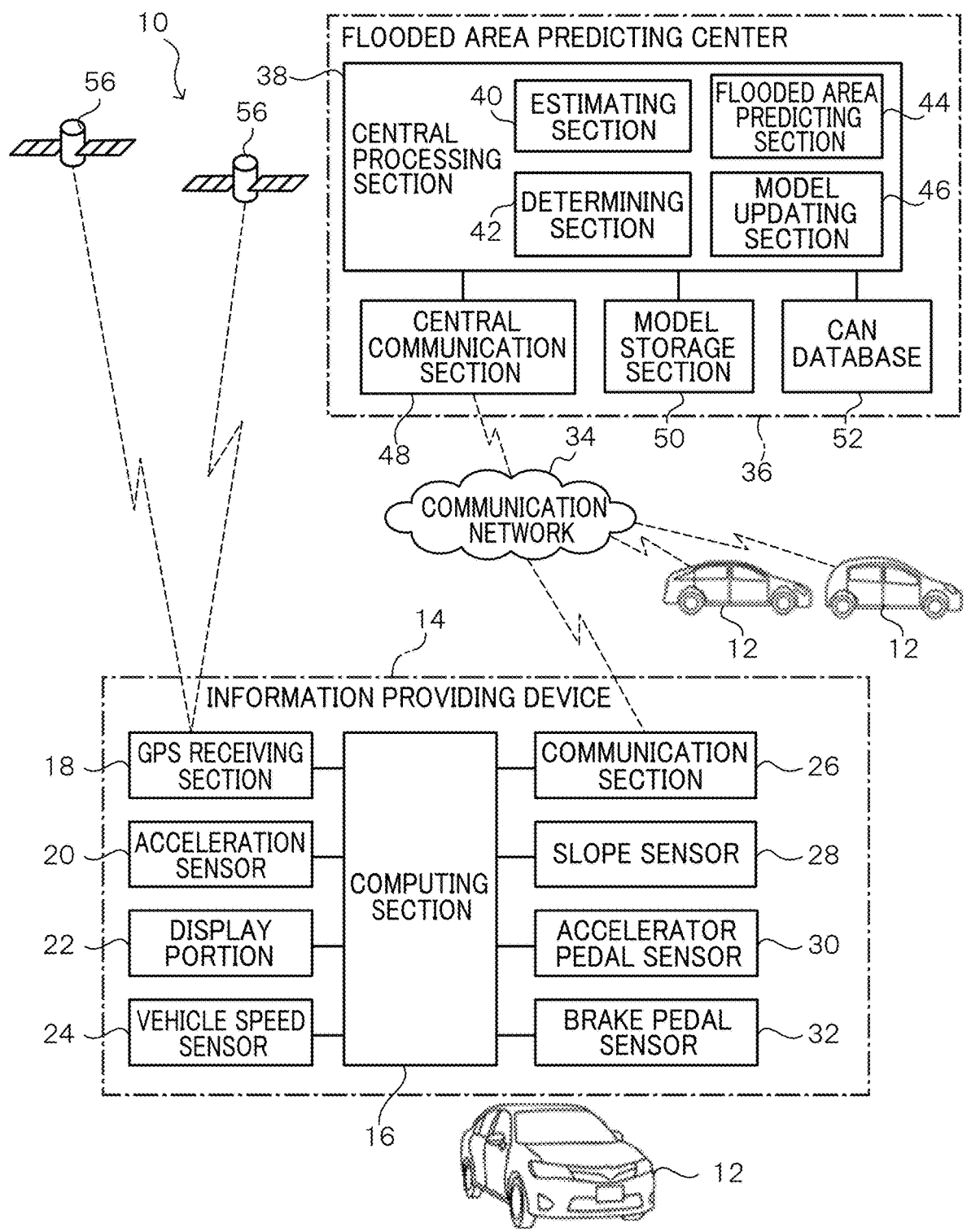
FIG. 1 is a block drawing showing the schematic configuration of a flood sensing system relating to a present exemplary embodiment.

An example of an exemplary embodiment of the present disclosure is described in detail hereinafter with reference to the drawings. FIG. 1 is a block drawing showing the schematic configuration of a flood sensing system relating to the present exemplary embodiment.

In a flood sensing system 10 relating to the present exemplary embodiment, information providing devices 14 that are installed in plural vehicles 12, and a flooded area predicting center 36, are connected via a communication network 34. The flooded area predicting center 36 collects, as CAN (Controller Area Network) data, traveling state data of the vehicles 12 from the information providing devices 14 that are installed in the plural vehicles 12. Then, by using the collected CAN data, the flooded area predicting center 36 carries out processings that determine flooding of the roads on which the respective vehicles 12 are traveling. Further, the flooded area predicting center 36 carries out processings that predict flooded areas, by using the results of determination on flooding of the roads on which the respective vehicles 12 are traveling.

The information providing device 14 that is installed in each vehicle 12 has a computing section 16, a GPS receiving section 18, an acceleration sensor 20, a display portion 22, a vehicle speed sensor 24, a communication section 26, a slope sensor 28, an accelerator pedal sensor 30, and a brake pedal sensor 32. Note that the acceleration sensor 20, the vehicle speed sensor 24, the slope sensor 28, the accelerator pedal sensor 30 and the brake pedal sensor 32 correspond to the detecting section.

The computing section 16 is configured by a general microcomputer that includes a CPU (Central Processing Unit), a ROM (Read Only Memory), a RAM (Random Access Memory) and the like.

The GPS receiving section 18 receives signals from GPS (Global Positioning System) satellites, and outputs the received GPS signals to the computing section 16. Due thereto, the computing section 16 measures the position of the own vehicle 12 on the basis of the GPS signals from plural GPS satellites.

The acceleration sensor 20 senses, as traveling state data, the acceleration that is applied to the own vehicle 12, and outputs the results of detection to the computing section 16. The acceleration may be detected in the longitudinal direction, the transverse direction and the vertical direction of the vehicle 12 respectively, or the acceleration in the longitudinal direction of the vehicle 12 only may be detected.

The display portion 22 displays information (e.g., map information and the like) relating to flooded areas that are predicted by the flooded area predicting center 36, and various types of information.

The vehicle speed sensor 24 detects the traveling speed of the own vehicle 12 as traveling state data, and outputs the results of detection to the computing section 16.

The communication section 26 communicates with the flooded area predicting center 36 and the information providing devices 14 that are installed in the other vehicles 12, by carrying out wireless communication with the communication network 34. For example, a wireless communication network such as a cell phone network or the like is an example of the communication network 34.

By detecting the tilting of the vehicle 12, the slope sensor 28 detects the slope on which the vehicle 12 is traveling as traveling state data, and outputs the results of detection to the computing section 16. As the slope, the slope in the longitudinal direction of the vehicle 12 only may be detected, or the slope in the vehicle transverse direction also may be detected in addition thereto.

The accelerator pedal sensor 30 detects the depressed amount of the accelerator pedal as traveling state data, and outputs the results of detection to the computing section 16.

The brake pedal sensor 32 detects the operated state of the brake pedal as traveling state data, and outputs the results of detection to the computing section 16.

The present exemplary embodiment describes an example in which the results of detection of the acceleration sensor 20, the vehicle speed sensor 24, the slope sensor 28, the accelerator pedal sensor 30 and the brake pedal sensor 32 are detected as the traveling state data, but the traveling state data are not limited to these.

The computing section 16 transmits the various types of traveling state data, which have been acquired from the respective sensors, and a vehicle type ID, which identifies the vehicle type, to the flooded area predicting center 36 via the communication section 26 and the communication network 34.

On the other hand, the flooded area predicting center 36 has a central processing section 38, a central communication section 48, a model storage section 50, and a CAN database 52.

The central communication section 48 communicates with the information providing devices 14 that are installed in the respective vehicles 12, by carrying out wireless communication with the communication network 34.

The model storage section 50 stores a coefficient table in which a vehicle behavior model, which determines a physical quantity that varies due to the vehicle 12 traveling (and details of which are described later), is set per vehicle type.

The CAN database 52 stores, as CAN data, the traveling state data that are acquired from the information providing devices 14 installed in the respective vehicles 12.

The central processing section 38 is configured by a general computer that includes a CPU (Central Processing Unit), a ROM (Read Only Memory), a RAM (Random Access Memory), and the like. The central processing section 38 has the functions of an estimating section 40, a determining section 42, a flooded area predicting section 44, and a model updating section 46. These respective functions are realized by programs that are stored in the ROM or the like being executed. Note that the respective functions of the central processing section 38 correspond to the acquiring section, the deriving section, the sensing section, the result collecting section and the predicting section, and details thereof correspond to the processings that are described hereinafter.

The estimating section 40 reads-out vehicle behavior models that are stored in advance in the model storage section 50, and specifies vehicle types from the vehicle type IDs, and selects coefficients corresponding to the vehicle types and applies them to the vehicle behavior models, and thereby derives a vehicle behavior model of each vehicle type. Further, the estimating section 40 computes an estimated value of the physical quantity by substituting the CAN data into the derived vehicle behavior model. In the present exemplary embodiment, the vehicle speed is used as the physical quantity that is estimated.

Coefficients, which are determined in advance and correspond to the vehicle type, are applied to the vehicle behavior model that has been derived in advance in order to determine the vehicle speed, and the estimated value of the vehicle speed is computed. Note that details of the vehicle behavior model that determines the vehicle speed are described in detail later.

Figure 2:
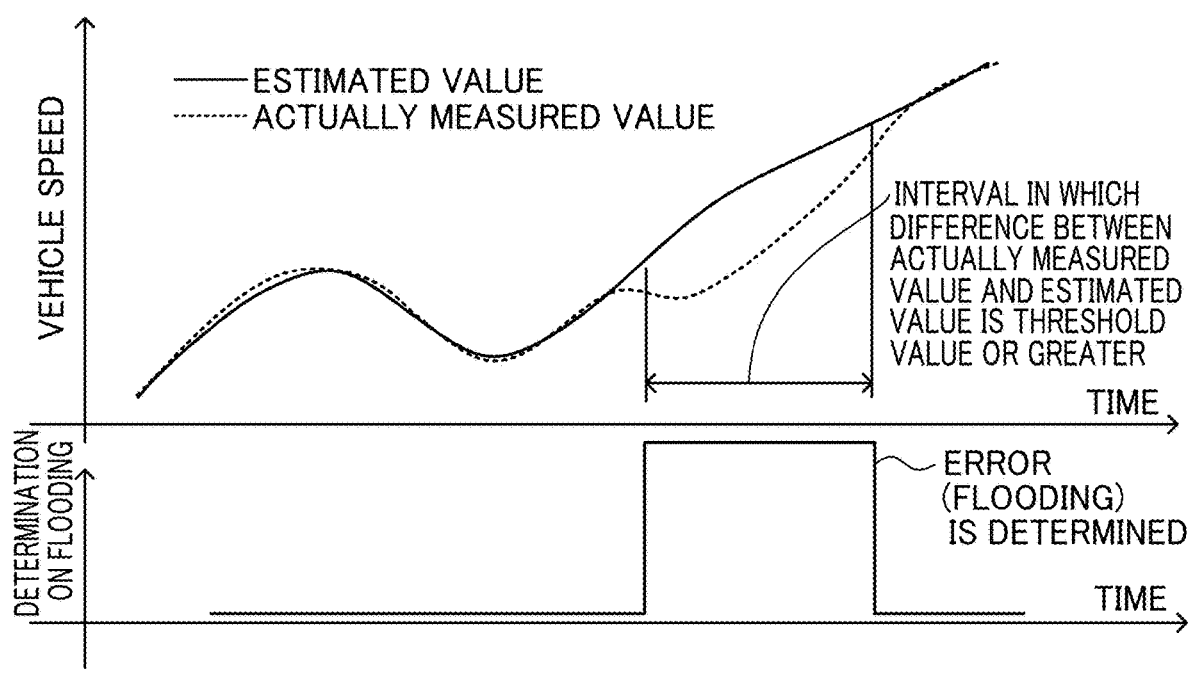
FIG. 2 is a drawing for explaining an error (flooding) determination using estimated values and actually measured values of vehicle speed.

The determining section 42 compares the vehicle speed estimated by the estimating section 40 and the actual vehicle speed acquired from the information providing device 14, and determines the absence/presence of flooding of a road. Concretely, the determining section 42 senses flooding of a road by determining that there is flooding in a case in which the difference between the estimated value and the actually measured value is greater than or equal to a predetermined threshold value. For example, as shown in FIG. 2, in a case in which the actually measured value and the estimated value vary over time, the determining section 42 determines that there is an error (flooding) during an interval in which a state, in which the difference between the actually measured value and the estimated value is greater than or equal to the predetermined threshold value, continues for a predetermined time (e.g., 5 seconds or more).

The flooded area predicting section 44 uses the results of determination of the determining section 42, and predicts flooded areas where roads are flooded. For example, a map is divided into 100 square meter sections that are defined as areas, and the results of determination of the determining sections 42 of the individual vehicles are collected. If, in any given area, a predetermined number or more of the determining sections 42 of vehicles determine, within a predetermined time period, that there is flooding, the flooded area predicting section 44 predicts that that area is a flooded area.

The model updating section 46, by machine learning, derives the coefficients of the vehicle behavior models by using the CAN data stored in the CAN database 52, and stores the coefficients in the model storage section 50, and updates the coefficient table of the models from time to time.

An example of the aforementioned vehicle behavior model that determines the vehicle speed is described in detail next. In the present exemplary embodiment, the vehicle behavior model that determines the vehicle speed as a physical quantity is derived by using an equation of motion.

First, the equation of motion is expressed by following formula (1).

$$M \times (dv/dt) = F \quad (1)$$

Note that M is the vehicle weight, dv/dt is the acceleration, and F is the force by which the vehicle 12 advances forward.

Here, dv/dt is approximately expressed by following formula (2).

$$dv/dt = (v(t+\Delta t) - v(t))/\Delta t \quad (2)$$

Note that v (t+Δt) is the vehicle speed after Δt seconds (the estimated vehicle speed), t is time, and v(t) is the vehicle speed at the present time.

By substituting formula (2) into formula (1), following formula (3) is obtained.

$$M \times (v(t+\Delta t) - v(t))/\Delta t = F \quad (3)$$

Arranging v (t+Δt) results in following formula (4).

$$v(t+\Delta t) = v(t) + (F/M) \times \Delta t \quad (4)$$

Here, the term F is F=F1 (the driving force of the vehicle 12)−F2 (the resistance the vehicle 12 receives), and, when the CAN data is used, $$F1 = C1 \times R \quad (5)$$

Note that C1 is the coefficient, and R is the amount of depression of the accelerator, and these are obtained from the CAN data.

$$F2 = \text{air resistance} + \text{slope resistance} + \text{rolling resistance} + \text{acceleration resistance} \quad (6)$$

air resistance=$C21 \times v(t)^2$ slope resistance=$C22 \times \sin\theta$ rolling resistance=$C23 \times v(t)$ acceleration resistance=$C24 \times a(t)$ Note that C21, C22, C23, C24 are coefficients, q is the road surface slope, v(t) is vehicle speed, and a(t) is acceleration, and these are obtained from the CAN data.

By substituting formula (5) and formula (6) into formula (4), the following multiple regression formula can be obtained as the vehicle behavior model.

$$v(t+\Delta t) = v(t) + \{C1 \times R - (C21 \times v(t)^2 + C22 \times \sin\theta + C23 \times v(t) + C24 \times a(t))\}(\Delta t/M) \quad (7)$$

By using the large amount of CAN data that is collected from the plural vehicles 12 and is stored in the CAN database, the respective coefficients are determined from learning models of multiple regression analysis, and are stored in the model storage section 50 as a coefficient table. Further, each time CAN data is newly acquired, the coefficients that are stored in the model storage section 50 are updated. Moreover, because the coefficients differ per vehicle type, the coefficients are determined and updated per vehicle type. For example, the coefficients that are stored in the model storage section 50 are stored as a table in which the vehicle types and the coefficients of the models are set in correspondence with one another, as shown in FIG. 3.

Figure 4:
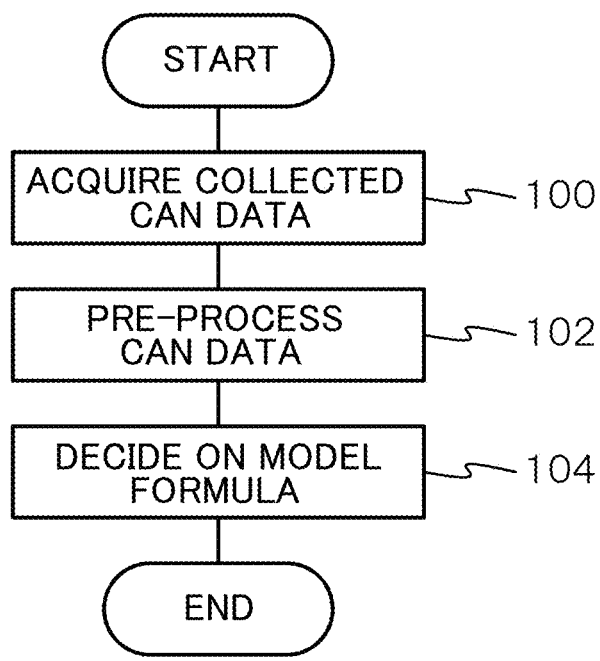
FIG. 4 is a flowchart showing a flow of processings that are carried out at a central processing section at the time of deriving a vehicle behavior model by machine learning, at a flooded area predicting center of the flood sensing system relating to the present exemplary embodiment.

The processings at the time when the central processing section 38 derives a vehicle behavior model at the flooded area predicting center 36 in the flood sensing system 10 relating to the present exemplary embodiment that is configured as described above, are described next. FIG. 4 is a flowchart showing an example of the flow of processings that are carried out at the central processing section 38 at the time when a vehicle behavior model is derived by machine learning, at the flooded area predicting center 36 of the flood sensing system 10 relating to the present exemplary embodiment. Note that the processings of FIG. 4 are carried out at the time of deriving the initial coefficients of the vehicle behavior model, and are carried out each time CAN data is collected in the CAN database 52.

In step 100, the model updating section 46 acquires CAN data that serves as traveling state data and is collected in the CAN database 52 via the central communication section 48, and proceeds to step 102. Note that step 100 corresponds to the acquiring section.

In step 102, the model updating section 46 carries out pre-processing on the acquired CAN data, and proceeds to step 104. As an example of the pre-processing, the CAN data is sorted per date/time and per vehicle type, and is classified per time and per vehicle type. Further, processing such as standardizing the time and interpolation with respect to data loss, or the like may be carried out on each CAN data.

In step 104, the model updating section 46 decides upon the model formula, and stores the model formula in the model storing section 50, and ends the series of processings. Namely, the respective coefficients of the multiple regression formula that serves as the above-described vehicle behavior model are derived by machine learning by using the CAN data, and are stored in the model storing section 50. If respective coefficients have already been stored, these respective coefficients are updated. Note that step 104 corresponds to the deriving section.

Figure 5:
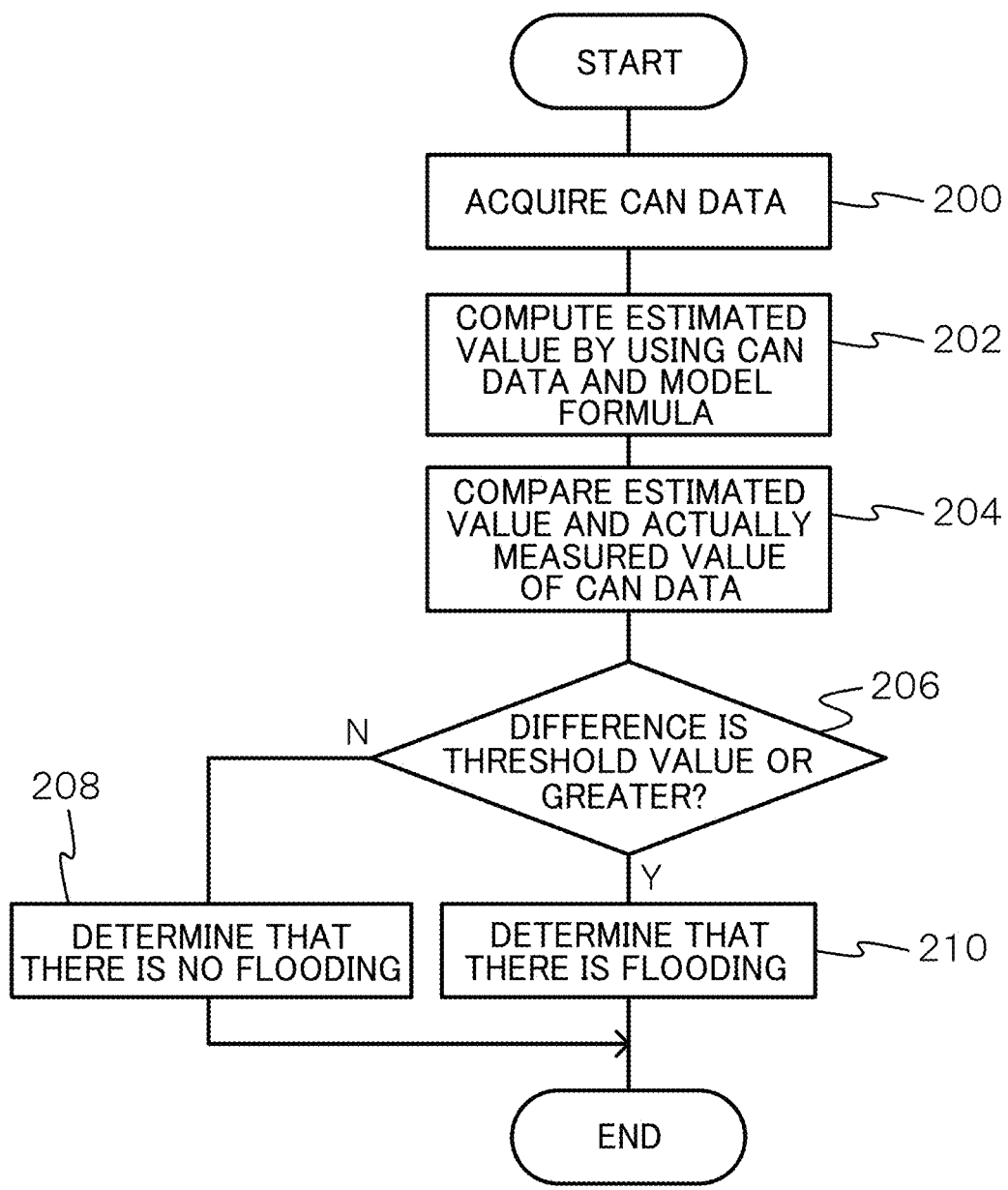
FIG. 5 is a flowchart showing a flow of processings that are carried out at the central processing section at the time of determining flooding, at the flooded area predicting center of the flood sensing system relating to the present exemplary embodiment.

Next, processings that the central processing section 38 carries out at the time of determining flooding on the basis of the CAN data from the respective vehicles 12 at the flooded area predicting center 36, are described. FIG. 5 is a flowchart showing an example of the flow of processings that are carried out at the central processing section 38 at the time of determining flooding, at the flooded area predicting center 36 of the flood sensing system 10 relating to the present exemplary embodiment. Note that the processings of FIG. 5 are started, for example, each time CAN data is acquired from the information providing devices 14 of the respective vehicles 12, or each time a predetermined amount of CAN data is acquired.

In step 200, the central processing section 38 acquires CAN data from the information providing devices 14 via the central communication section 48 and the communication network 34, and proceeds to step 202. Note that step 200 corresponds to the acquiring section, and the processings of steps 202 through 210 that are described hereinafter correspond to the sensing section.

In step 202, the estimating section 40 computes an estimated value of the vehicle speed by using the acquired CAN data and the vehicle behavior model, and proceeds to step 204. Namely, the estimating section 40 reads-out the vehicle behavior model that is stored in the model storage section 50, and specifies the vehicle type from the vehicle type ID, and selects the coefficients that correspond to the vehicle type, and applies the coefficients the vehicle behavior model. Further, the estimating section 40 computes the estimated value of the vehicle speed by substituting the acquired CAN data into the vehicle behavior model.

In step 204, the determining section 42 compares the estimated value of the vehicle speed, and the actually measured value of the vehicle speed of the actual CAN data acquired from the information providing device 14, and proceeds to step 206.

In step 206, the determining section 42 determines whether or not the difference between the estimated value and the actually measured value is greater than or equal to a predetermined threshold value. If this determination is negative, the determining section 42 proceeds to step 208, whereas if this determination is affirmative, the determining section 42 proceeds to step 210.

In step 208, the determining section 42 determines that the road, on which the vehicle 12 whose CAN data was acquired is traveling, is not flooded, and ends the processings.

On the other hand, in step 210, the determining section 42 determines that the road, on which the vehicle 12 whose CAN data was acquired is traveling, is flooded, and ends the processings.

Figure 6:
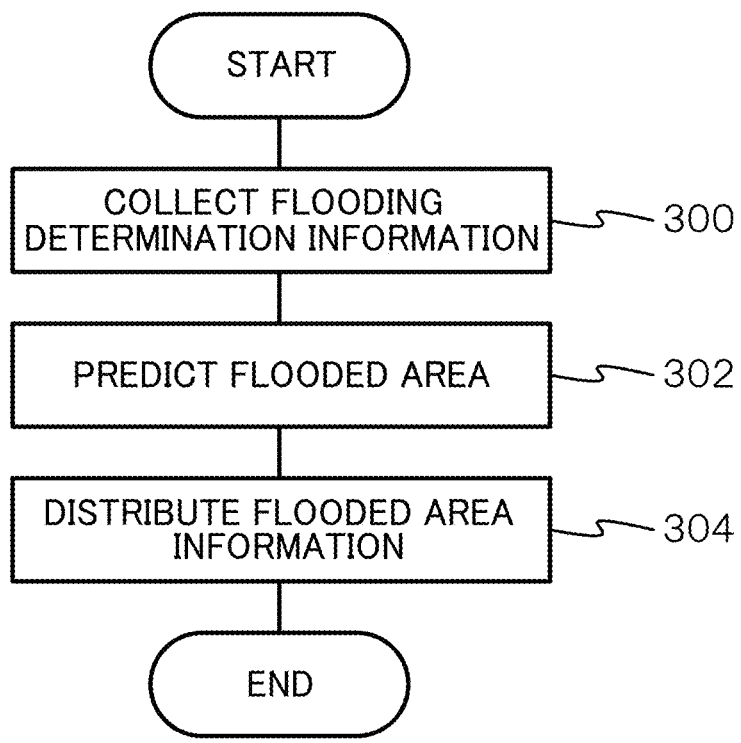
FIG. 6 is a flowchart showing a flow of processings by which the central processing section predicts a flooded area at the flooded area predicting center, in the flood sensing system relating to the present exemplary embodiment.

Next is described the processings by which the central processing section 38 at the flooded area predicting center 36 predicts a flooded area, in the flood sensing system 10 relating to the present exemplary embodiment. FIG. 6 is a flowchart showing an example of the flow of processings by which the central processing section 38 at the flooded area predicting center 36 predicts a flooded area, in the flood sensing system 10 relating to the present exemplary embodiment.

In step 300, the flooded area predicting section 44 collects flood determination information, and proceeds to step 302. Namely, the results of determination on flooding of FIG. 5. Note that step 300 corresponds to the results collecting section.

In step 302, the flooded area predicting section 44 predicts a flooded area, and proceeds to step 304. As described above, in the predicting of a flooded area, the flooded area predicting section 44 predicts a flooded area in which the road is flooded, by using the results of determination of the determining section 42. For example, a map is divided into 100 square meter sections that are defined as areas, and the results of determination of the determining sections 42 of the individual vehicles are collected. If, for any given area, a predetermined number or more of the determining sections 42 of vehicles determine, within a predetermined time period, that there is flooding, the flooded area predicting section 44 predicts that area to be a flooded area. Note that step 302 corresponds to the predicting section.

In step 304, the flooded area predicting section 44 distributes flooded area information, and ends the processings. Next, for example, the flooded area predicting section 44 distributes, via the central communication section 48, flooded area information to the information providing devices 14 that are connected to the communication network 34. By doing so, the vehicles 12 in which the respective information providing devices 14 are installed can know of the flooded areas, and can select routes that do not pass through the flooded areas. For example, in a case in which guiding of a vehicle along a route that passes-through a flooded area is being carried out by a navigation device, the vehicle can be re-routed to a route that avoids the flooded area. Or, the flooded area information may be transmitted to a weather forecasting company or the like that needs such information, and compensation can be received therefor.

Figure 7:
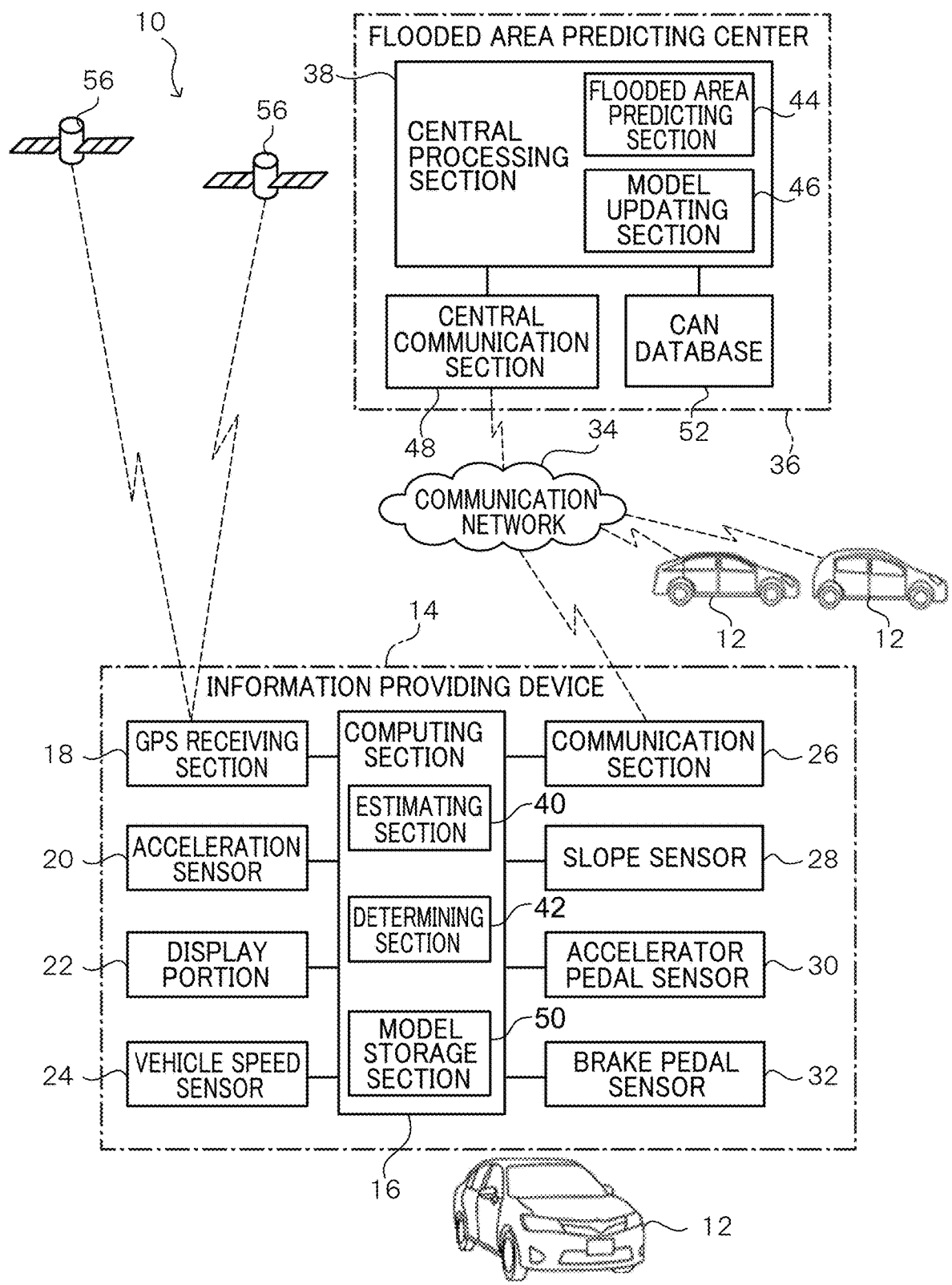
FIG. 7 is a block drawing showing a structural example of a flood sensing system in a case in which determination on flooding is carried out at information providing devices that are installed in respective vehicles.

Note that the above-described exemplary embodiment describes an example in which determination of flooding is carried out at the flooded area predicting center 36, but the present disclosure is not limited to this. For example, the determination on flooding may be carried out at the information providing devices 14 that are installed in the respective vehicles 12. FIG. 7 is a block drawing showing a structural example of a flood sensing system in a case in which the determination on flooding is carried out at the information providing devices 14 that are installed in the respective vehicles 12. In this case, as shown in FIG. 7, the functions of the estimating section 40, the determining section 42, and the model storage section 50 are given to the information providing device 14. Namely, a vehicle behavior model, which corresponds to the vehicle type of the vehicle 12 in which the information providing device 14 is installed, is derived in advance and stored in the model storage section 50. Or, there is a configuration in which plural vehicle behavior models for each vehicle type are derived in advance and stored, and, at the time of usage, the vehicle behavior model that corresponds to the own vehicle is selected. Further, due to the computing section 16 of the information providing device 14 executing the processings of FIG. 5, the estimated value can be computed by the estimating section 40, and the determination on flooding by the determining section 42 can be carried out in the same way as in the above-described exemplary embodiment. Further, at the time of predicting a flooded area, due to the central processing section 38 of the flooded area predicting center 36 collecting the results of determination on flooding from the respective vehicles 12 and carrying out the processings of FIG. 6, the flooded area predicting center 36 can predict the flooded areas. Note that, in a case in which the determination on flooding is carried out at the information providing devices 14 that are installed in the respective vehicles 12, the processings of FIG. 5 are appropriately converted to processings carried out by the computing section 16. Further, the processing of step 200 that the computing section 16 carries out in this case corresponds to the acquiring section, and the processings of steps 202 through 210 correspond to the sensing section.

Figure 8:
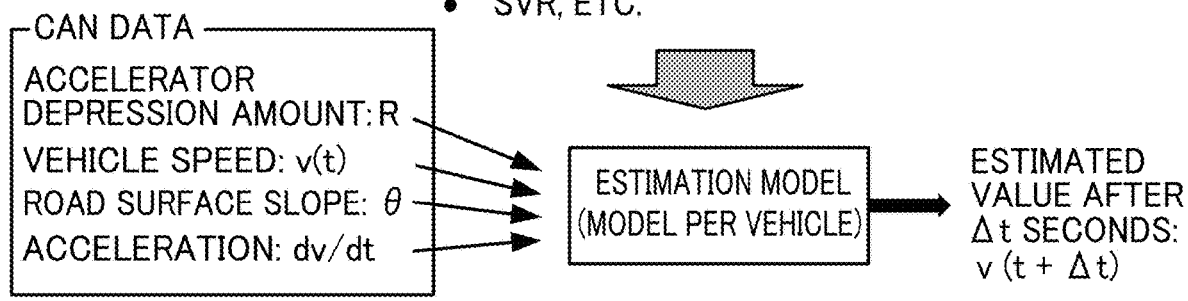
FIG. 8 is a drawing for explaining another example of a vehicle behavior model.

Further, although the above exemplary embodiment describes an example that uses a multiple regression formula as the vehicle behavior model, the vehicle behavior model is not limited to machine learning by a multiple regression formula. For example, as shown in FIG. 8, any of various estimating models, which determine the estimated value v (t+Δt) after Δt seconds by using the CAN data (the accelerator depression amount R, the vehicle speed v(t), the road surface slope θ, the acceleration dv/dt, and the like) as the respective terms of the explanatory variables of the estimating formula, can be used as the vehicle behavior model. Various types of machine learning models such as neutral networks, support vector regression (SVR) and the like are examples of estimating models other than multiple regression analysis.

Further, although the above exemplary embodiment uses a vehicle behavior model that determines the vehicle speed as the physical quantity, the physical quantity is not limited to this. For example, a vehicle behavior model that determines another physical quantity, such as acceleration, rate of change in acceleration, or the like, may be used.

In the above exemplary embodiment, the vehicle behavior model is derived by using air resistance, slope resistance, rolling resistance and acceleration resistance as the resistance F2 that the vehicle receives. However, the resistance F2 that the vehicle receives is not limited to this. For example, because rolling resistance and acceleration resistance are small as compared with other resistances, at least one resistance may be omitted.

Description has been given in which the processings, which are carried out by the respective sections of the flood sensing system 10 in the above-described respective exemplary embodiments, are software processings that are carried out by the execution of programs. However, the present disclosure is not limited to this. The processings may be, for example, processings that are carried out by hardware. Or, the processings may be processings that combine both software and hardware. Further, in the case of software processings, the programs may be stored on any of various types of storage media and distributed.

The present disclosure is not limited to the above, and can of course be implemented by being modified in various ways other than the above within a scope that does not depart from the gist thereof

What is claimed is:

1. A flood sensing device comprising:
a memory: and
a processor coupled to the memory, the processor configured to:
acquire a plurality of types of traveling state data relating to traveling of a vehicle; and
sense flooding of a road on which the vehicle travels by using (a) a physical quantity that is estimated on the basis of (i) a vehicle behavior model derived by machine learning using a multiple regression formula, which is configured by a driving force of the vehicle and a traveling resistance that includes an air resistance applied to the vehicle, a slope resistance applied to the vehicle, and a rolling resistance applied to the vehicle, and which determines the physical quantity that varies due to the vehicle traveling, and (ii) the plurality of types of traveling state data of the present time that are acquired, and (b) the physical quantity that is obtained from the traveling state data of the present time that is acquired.

2. The flood sensing device of claim 1, wherein the traveling resistance further includes acceleration resistance that is applied to the vehicle.

3. The flood sensing device of claim 1, wherein the processor is further configured to, in a case in which a difference between the estimated physical quantity and the physical quantity obtained from the traveling state data is greater than or equal to a predetermined threshold value, determine that there is flooding and sense flooding.

4. The flood sensing device of claim 1, wherein the vehicle behavior model is derived by using an equation of motion, by using speed, acceleration, or rate of change in acceleration of the vehicle, as the physical quantity.

5. A non-transitory computer readable medium storing a flood sensing program executed by a computer to perform a process comprising:
acquiring a plurality of types of traveling state data relating to traveling of a vehicle; and
sensing flooding of a road on which the vehicle travels by using (a) a physical quantity that is estimated on the basis of (i) a vehicle behavior model derived by machine learning using a multiple regression formula, which is configured by a driving force of the vehicle and a traveling resistance that includes an air resistance applied to the vehicle, a slope resistance applied to the vehicle, and a rolling resistance applied to the vehicle, and which determines the physical quantity that varies due to the vehicle traveling, and (ii) the plurality of types of traveling state data of the present time that are acquired, and (b) the physical quantity that is obtained from the traveling state data of the present time that is acquired.

* * * * *